INVENTOR
JOSEPH F. NEKOLA
BY
ATTORNEY

May 19, 1959 J. F. NEKOLA 2,887,637
SERVO SYSTEM AND VARIABLE GAIN AMPLIFIER THEREFOR
Filed July 25, 1955 2 Sheets-Sheet 2

INVENTOR
JOSEPH F. NEKOLA
BY
ATTORNEY

United States Patent Office 2,887,637
Patented May 19, 1959

2,887,637

SERVO SYSTEM AND VARIABLE GAIN AMPLIFIER THEREFOR

Joseph F. Nekola, Huntington Station, N.Y., assignor to Sperry Rand Corporation, a corporation of Delaware Application July 25, 1955, Serial No. 524,057

10 Claims. (Cl. 318—31)

The present invention relates to servo systems. It is particularly concerned with a servo system utilizing a subsidiary negative feedback loop for stabilization.

It is an object of the present invention to provide a servo system which is sluggish for small data input changes and which becomes increasingly responsive for abrupt data input changes of larger and larger magnitude.

It is a further object of the invention to provide a servo system as aforedescribed which operates in its most responsive mode for data input changes above a predetermined magnitude.

It is another object of the invention to provide a servo system as aforedescribed which has a slow response for a relatively steady state data input thereto so that input noises (small transient input disturbances) are effectively filtered and prevented from adversely affecting the output of the servo system.

It is a further object of the present invention to provide a memory storage circuit for a servo system for insuring that the system, once operated in its most responsive mode for a large data input change, will remain operated in such a mode until after a substantially steady state data input operating condition is attained, at which time the system is quickly and automatically restored back into a slow or sluggish response mode.

It is yet another object of the present invention to provide a servo system having a memory storage circuit as aforedescribed wherein the time constant of the storage circuit has a variable characteristic so that the system will go from a fast to a sluggish mode of operation in a minimum of time after a data input reaches steady state, regardless of the magnitude of a servo error signal brought about in response to a data input change.

The foregoing and other objects and advantages of the present invention which will become apparent from the accompanying drawings and detailed description thereof are attained by utilizing a servo system having a subsidiary negative feedback loop which includes a variable gain amplifier having a variable time constant resistor-capacitor (R-C) memory storage circuit therein. The gain of the amplifier is adapted to be decreased for less negative feedback when servo error signals increase in magnitude so as to provide a more responsive servo system. When servo error signals above a predetermined magnitude are produced, amplifier gain is at a minimum and the servo system is operated in its most responsive mode. The memory circuit is connected to the amplifier as a means for supplying a bias thereto for regulating amplifier gain. The memory circuit is adapted to store a voltage proportional to the magnitude of a servo error signal for maintaining a sufficient bias for minimum amplifier gain after a large servo data input change until the input reaches steady state. A resistor having non-linear resistance characteristic is utilized in the discharge path of the R-C memory circuit for insuring that, after a steady state data input is reached, the amplifier gain is increased as soon as possible so that the servo system will be quickly returned to a sluggish mode of operation. Such a system is useful, for example, in a tracking radar wherein it is desired for a servo thereof to be sluggish for filtering out small transient disturbances at the data input thereof during target tracking while automatically becoming highly responsive during target acquisition when large changes in the input data to a servo system would normally be incurred, it being desired that the system go back into a sluggish operating mode automatically as soon as the tracking mode of operation for the radar is restored.

Referring to the drawings.

Figure 1:
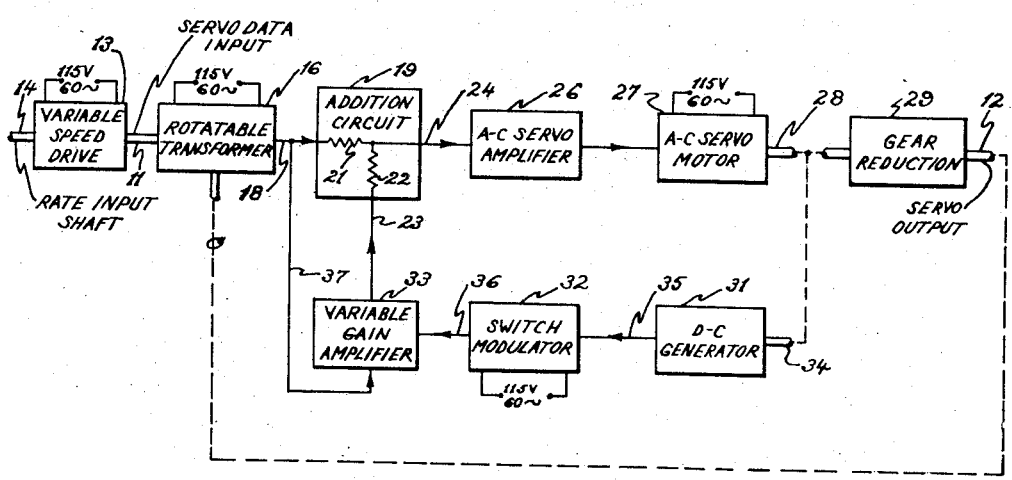
Fig. 1 is a general block diagram of a servo system having a subsidiary feedback loop which includes a variable gain amplifier having a variable time constant memory storage circuit in accordance with the present invention.

Referring to Fig. 1, shaft 11 represents a rotatable servo data input shaft with shaft 12 a rotatable servo output shaft whose angular position is required to follow the angular position of shaft 11 with greatly increased torque. The input shaft 11 receives angular data input information for the servo system from a conventional variable speed drive mechanism 13, for example. The mechanism 13 regulates the angular position of shaft 11 in accordance with the rate of revolution of a rate input shaft 14. The rate of revolution of shaft 14 might be a function of the velocity in some coordinate of an aircraft to be tracked by a radar system of which the servo system may comprise a part.

A linear rotatable transformer 16 is coupled to the servo data input shaft 11 and the servo output shaft 12 for comparing their positions. Transformer 16 is conventional in the servo art and may be similar to the device shown on page 93 of the book entitled "Theory of Servomechanisms," volume 25 of the Radiation Laboratory Series, copyright 1947, by McGraw-Hill, for example. Such a transformer has an alternating line voltage input as indicated in Fig. 1 of 60 cycles per second, for example, and is adapted to provide a servo alternating error voltage output at lead 18 of a magnitude proportional to the difference between the angular positions of the servo shafts 11 and 12. The phase of the error voltage output from transformer 16 reverses with a change in the sense or direction of the difference between shafts 11 and 12.

The output error voltage lead 18 from the transformer 16 is coupled to the input of an electrical addition circuit 19 comprising parallel connected resistors 21 and 22 for combining a servo error voltage with a negative feedback voltage supplied by lead 23 from a subsidiary servo feedback loop in the system whose function will be described further below. An output lead 24 for the addition circuit 19 is coupled to the input of an A.-C. servo amplifier 26 for providing a push-pull alternating current signal in the field windings of an A.-C. servo motor 27.

In a manner known in the art, an output shaft 28 of motor 27 is turned in a direction determined by the phase of the aforementioned push-pull signal, which depends on the phase of the servo error signal at the output of transformer 16. The motor shaft 28 is turned at a rate or velocity which is a function of the voltage signal from amplifier 26 and the operating characteristics of motor 27.

A conventional gear reduction device 29 whose output shaft 12 comprises the servo system output is coupled to servomotor shaft 28 so that the shaft 12 will only be turned a fraction of a turn for a complete revolution of motor shaft 28. When the servo input shaft 11 is rotated from one angular position to another, the servo error signal generated at the output of transformer 16 is applied to the servo control path comprising devices 19, 26 and 27 for causing servomotor 27 to revolve until the angular position of servo output shaft 12 corresponds to that of servo input shaft 11 and the servo error signal is reduced to zero.

The subsidiary negative feedback loop in the system of Fig. 1 comprises a D.-C. generator 31, a modulator 32, and a variable gain amplifier 33. The aforementioned loop is coupled between one point in the servo control path at the output of servomotor 27 and a further point in said control path at the input lead 23 for addition circuit 19. The subsidiary feedback loop is provided, as is conventional in the art, for producing a negative feedback voltage proportional to the velocity of rotation of motor shaft 28. Such a velocity feedback voltage is degenerative for the servo error voltage from transformer 13 and reduces the signal applied to servo amplifier 26 for increasing the stability and performance of the servo system in a manner well known in the art.

The D.-C. generator 31, which may comprise a tachometer, has an input shaft 34 connected directly to servomotor shaft 28 by suitable gearing, not shown. Generator 31 is adapted to provide a D.-C. output voltage at lead 35 whose magnitude is a function of the velocity of rotation of servomotor shaft 28 and whose polarity with respect to ground reverses for a change in the direction of rotation of the shaft 28. The output voltage at lead 35 is converted into an alternating voltage by a modulator 32 which shunts the lead 35 to ground during alternate half cycles of a 60 cycle A.-C. line voltage indicated as being supplied to modulator 32 in Fig. 1.

The alternating voltage output upon lead 36 from modulator 32 should be in phase with the alternating voltage servo error signal from rotatable transformer 13 at lead 18, the phase of the modulator output voltage reversing with a reversal in polarity of the D.-C. output voltage from generator 31 provided when the servomotor shaft 28 reverses its direction of rotation as a result of a reversal in phase of the servo error voltage. The modulator 32 may comprise any conventional switch modulator such as described on pages 402 and 403 of the book entitled "Waveforms," volume 19 of the Radiation Laboratory Series, copyright 1949 by McGraw-Hill. The circuit connections for the modulator 32 may be similar to those shown in Figs. 11–14 (A) on page 404 of the above-described book, for example.

The amplifier 33 of the subsidiary feedback loop is provided for receiving the modulated voltage at lead 36 and for producing an amplified version of said voltage at output lead 23. The gain of amplifier 33 is made variable in accordance with the magnitude of the error signal from rotatable transformer 16 supplied to amplifier 33 by lead 37. It is desired that the servo system be operated in a sluggish or slow response mode with a large relative amount of negative feedback for small input changes at shaft 11, the amplifier 33 having decreased gain with the servo system becoming increasingly responsive for abrupt servo data input changes of increased magnitude. When relatively abrupt changes of magnitude above a predetermined amount are incurred, the gain of amplifier 33 is at a minimum and the servo system is operated in its most responsive mode until after the servo error signal voltage is reduced below a predetermined amount.

Figure 2:
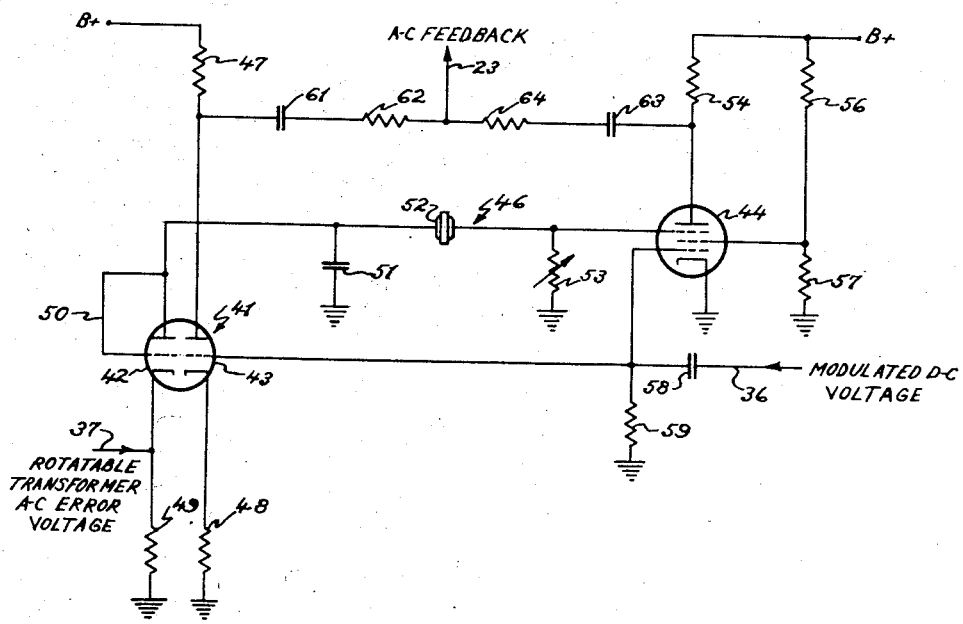
Fig. 2 is a schematic diagram of the variable gain amplifier in accordance with the present invention for use in a servo system as shown in Fig. 1.

Referring to Fig. 2, the variable gain amplifier 33 is illustrated therein and includes a twin tube 41 comprising triodes 42 and 43, a pentode tube 44 and an R-C memory storage circuit 46 between tubes 42 and 44. The gain of pentode 44 is controlled by a negative biasing voltage supplied to the suppressor grid thereof from the R-C circuit 46 as will become more clear below.

The plate of tube 42 is coupled directly to the grid thereof by a lead 50, the cathode of tube 42 being coupled to ground through a resistor 49. Tube 42 is adapted to function as a half-wave rectifier of alternating servo error voltages supplied across the resistor 49 by lead 37 from rotatable transformer 16.

The plate of the triode 43 is coupled to a B+ source of power supply through a load resistor 47, the cathode of tube 43 being coupled to ground through a cathode biasing resistor 48. Tube 43 is adapted to be operated as a low frequency triode amplifier, the control grid thereof being connected to lead 36 for receiving a servo velocity feedback voltage for amplification.

The memory storage circuit 46 includes a capacitor 51, a resistor 52 of non-linear resistance material in which current varies as a power of the applied voltage and a further resistor 53. The resistor 52 is coupled between the plate of tube 42 and the suppressor grid of pentode 44. Capacitor 51 is coupled between the side of resistor 52 connected to the plate of tube 42 and ground. Resistor 53 is coupled between the other side of the aforementioned resistor 42 and ground. Resistor 53 may be adjustable in value if desired.

The plate of the pentode tube 44 is coupled through a load resistor 54 to a B+ source of power supply as indicated in Fig. 2. A voltage divider comprising serially connected resistors 56 and 57 is connected between the aforementioned power supply for pentode 44 and ground. A junction between resistors 56 and 57 is connected to the screen grid of tube 44 for biasing this grid at a small positive voltage with respect to ground. The cathode of tube 44 is grounded, the control grid thereof being connected in parallel with the control grid of tube 43 and lead 36 from modulator 32 in Fig. 1. Pentode 44 is adapted for operation as a low frequency amplifier whose gain is a function of suppressor grid voltage derived from the storage circuit 46, the gain of tube 44 being decreased as such a voltage becomes increasingly negative with respect to ground.

The control grids of triode 43 and pentode 44 are coupled to the modulator output lead 36 through an R-C circuit comprising capacitor 58 in series with lead 36 and a resistor 59 connected between an output terminal of capacitor 58 and ground. The R-C circuit 58—59 is adapted to change any modulated D.-C. voltage upon lead 36 into an alternating voltage signal of one or an opposite phase (depending on the polarity of the modulated voltage upon lead 36), the aforementioned alternating voltage being supplied to the grids of tubes 43 and 44 for amplification and degeneration of the servo error signal from transformer 16 supplied directly to addition circuit 19.

The plate of triode 43 is coupled through a capacitor 61 and resistor 62 to the output lead 23 of the amplifier 33. Similarly, the plate of the pentode 44 is coupled through a capacitor 63 and resistor 64 to the amplifier output lead 23. Thus, an alternating amplifier output voltage at the lead 23 comprises the sum of amplified voltages derived from the plates of triode 43 and pentode 44.

Figure 3:
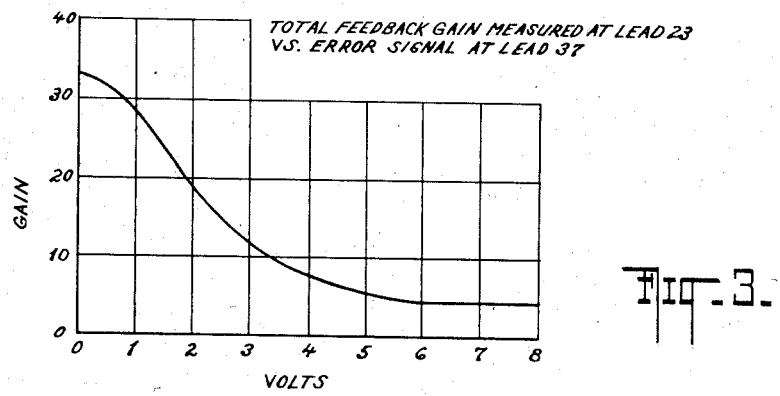
Fig. 3 is a graph for illustrating the variation in gain of the variable gain amplifier of Fig. 2 versus servo error signal voltages.

When the angular position of the servo input shaft 11 is abruptly changed, an error signal is generated by transformer 16 and supplied to the cathode of tube 42 in Fig. 3. This signal is rectified by tube 42, filtered and smoothed by the circuit 46, and applied as a negative voltage to the suppressor grid of tube 44 for reducing its gain. Thus, the combined output of tubes 43 and 44 is reduced with increasing servo error signal voltages even though the modulated D.-C. velocity feedback voltage applied to the grids of tubes 43 and 44 increases. Therefore, the magnitude of the degenerative feedback voltage supplied to the addition circuit 19 relatively to the magnitude of the servo error voltage supplied thereto is reduced for larger servo error signals so that the servo system becomes increasingly responsive for larger data input changes thereto.

A graph for illustrating the gain of amplifier 33 measured at lead 23 as a function error signal voltage at lead 37 is shown in Fig. 3. The error signal voltage of approximately 7 volts indicated in Fig. 3 might correspond to a servo system error above which it is desired that the system be operated in its most responsive mode.

Figure 4:
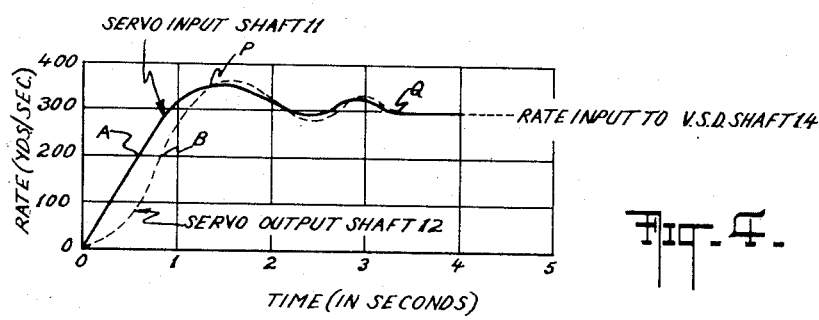
Fig. 4 is a graph for illustrating response characteristics of a servo system as shown in Fig. 1 including the variable gain amplifier circuit of Fig. 2.

An abrupt change in the position of data input shaft 11 large enough to cause a servo error signal voltage to be produced which is larger than that required for minimum gain of amplifier 33 as shown in Fig. 3 might correspond to what would occur during target acquisition if the servo system were used in a radar system for following some component of velocity of a radar target, for example. Fig. 4 is a graph for illustrating servo response with time of the servo input shaft 11 and servo output shaft 12 for an abrupt step change in the rate of revolution of V.S.D. (variable speed drive) input shaft 14 from zero to a value corresponding to a radar target velocity of 300 yds./sec., for example. The curves A and B in Fig. 4 are for servo shafts 11 and 12, respectively, any point thereon in a direction along the ordinate of the graph corresponding to an angle shaft position representing a velocity or rate at a particular time as measured along the abscissa. The difference between curves A and B is indicative of a servo error, the maximum difference therebetween corresponding to an error for which an alternating voltage signal from transformer 16 will be well above the 7 volt value in Fig. 3 so that a fast mode of servo response will be incurred.

In operation, the servo system of Fig. 1 is initially sluggish and in a smoothing mode of response before receiving an input as shown in Fig. 4 so as to filter out small transient input disturbances. This occurs since the gain of amplifier 33 is at a maximum for zero or small servo errors and a maximum amount of degenerative feedback is supplied to circuit 19 upon occurrence of small disturbances at input shaft 14 which might produce a servo error. Immediately after a large rate change in the velocity of rotation of the input shaft 14 of the variable speed drive 13 from zero to a rate corresponding to a target velocity of 300 yds./sec., for example, the angular position of the shaft 11 initially lags a correct position corresponding to such a rate. Similarly, the position of the output shaft 12 of the servo system will lag the angular position of shaft 11. This is clearly seen from the curves in Fig. 4.

As the servo error signal at the output of the transformer 16 resulting from the lag between the curves A and B in Fig. 4 increases after the aforementioned large step rate input, the rectified error voltage at the output of tube 42 and the smoothing circuit 46 in Fig. 2 becomes more negative so as to provide a larger and larger negative bias at the suppressor grid of tube 44. As the negative bias on the aforementioned suppressor grid increases due to the build up of servo error voltage, the gain of pentode 44 decreases until it is substantially cut off and the gain of amplifier 33 is at a minimum. Thus, whenever a servo system error signal goes to or above a certain value as indicated in the graph in Fig. 3, the degenerative feedback voltage supplied by amplifier 33 to addition circuit 19 is minimized and limited to the output of the triode tube 43. Tube 43 is required for providing feedback when tube 44 is cut off so that excessive oscillations of servo output shaft 12 will be minimized for large servo error signals.

Referring again to Fig. 4, a servo error voltage null occurs at the first intersection of curve A with curve B at point P, for example. However, the variable speed drive output (servo data input shaft 11) has not settled out to its steady state. Therefore, it is desired that the gain amplifier 33 remain at a minimum with the servo system being in its most responsive mode until the output shaft 11 of the variable speed drive 13 reaches steady state. Otherwise, if the gain of amplifier 33 were allowed to increase at the same time that the aforementioned null is attained at point P, the system would be driven into a sluggish response mode too quickly and it would take an undesirable length of time for servo output shaft 12 to reach a steady position corresponding to the servo input shaft 11.

The memory circuit 46 prevents the amplifier 33 from being restored back to maximum gain for sluggish servo response in too early a time by storing a voltage proportional to the rectified servo error voltage at the output of tube 42 for a predetermined duration extending well beyond the time the error voltage goes through a null. This duration is determined by the discharge time of capacitor 51 through "Thyrite" resistor 52 and resistor 33, and should be calculated so that, for the particular system in which it is employed, the data servo input shaft 11 reaches a steady state condition such as at point Q in Fig. 4 before the servo system is driven back into a sluggish mode of operation.

If an RC network having fixed values of resistance and capacitance were substituted for the memory circuit 46, it may be seen that the time delay from a servo error signal null before the pentode 44 is returned to a condition wherein it has maximum gain properties would be variable depending on the magnitude of the error voltage supplied to circuit 46 from the rectifier 42. For example, with the capacitor charged to increasingly larger voltages, it would take increasingly longer for the capacitor to discharge to a voltage of magnitude whereat the gain of pentode 44 begins to increase.

The "Thyrite" resistor 52 is a non-linear resistance element in which the current varies as a power of an applied voltage, i.e. the resistance decreases as the applied voltage is increased. Therefore, the characteristics of the "Thyrite" resistor 52 cause the R-C time constant of memory circuit 46 to vary inversely with the voltage applied across capacitor 51. Thus, with "Thyrite" resistor 52 the memory circuit 46 could be chosen to provide a time delay for both large and small error voltage applied across the capacitor 51 which would cause the suppressor grid bias of pentode 44 to be returned to a value for maximum gain as soon as possible after the input shaft 11 attains a steady state condition. In addition to its effect on the time delay, resistor 53 determines the value of the servo error voltage at cut-off for the pentode tube 44. The smoothing characteristics of the system can be conveniently changed by varying the value of resistor 53.

It is noted that for error voltage inputs at the cathode of rectifier tube 42 of amplifier 33 up to a certain value as indicated in Fig. 3, the amplifier gain decreases gradually so that the responsiveness of the servo system increases until the servo system goes to its most responsive mode. The gradual change from slow to fast settling of the servo system of the present invention minimizes the introduction of undesired step transients at the output shaft 12 which might occur if an abrupt change from slow to a fast mode of operation was permitted.

Figure 5:
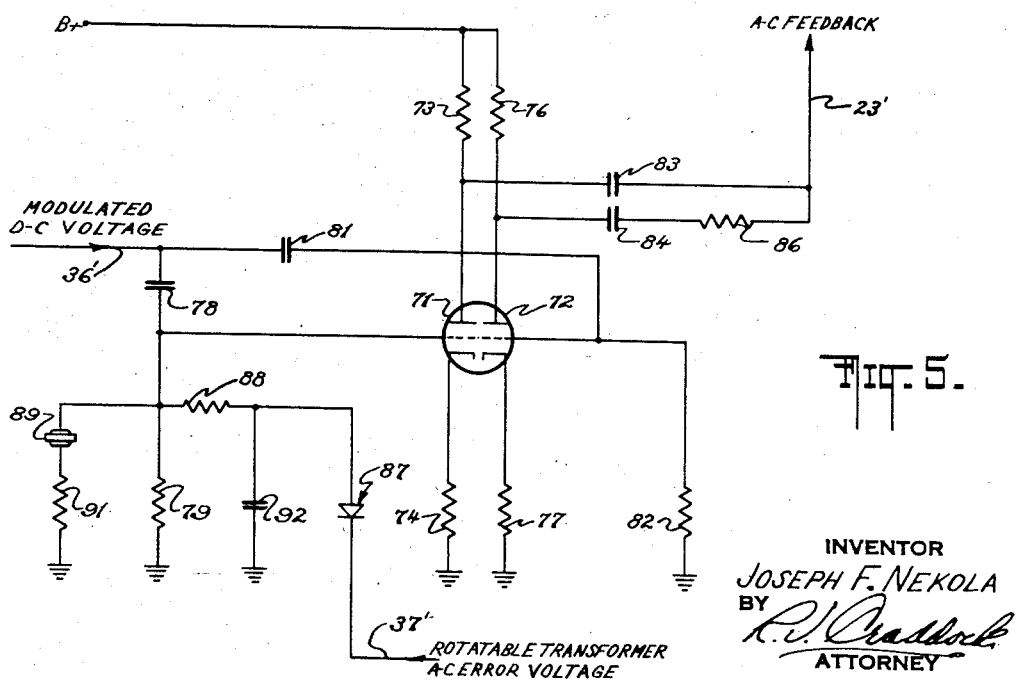
Fig. 5 is an alternative embodiment of a variable gain amplifier including a variable time constant memory circuit which may be used in the servo system of Fig. 1 in lieu of the amplifier shown in Fig. 2.

An alternative embodiment for the variable gain amplifier shown in Fig. 3 is illustrated in Fig. 5. The amplifier of Fig. 5 may comprise the amplifier 33 in the system of Fig. 1, primed reference numerals designating certain leads in Fig. 5 referring to similar leads in Fig. 1 designated by corresponding unprimed numerals. The amplifier in Fig. 5 includes a pair of triode amplifier tubes 71 and 72 whose outputs are combined for providing a degenerative feedback voltage at lead 23'. The servo velocity feedback voltage for the amplifier of Fig. 5 is supplied thereto by lead 36', the servo error voltage for gain control purposes being supplied by lead 37'.

The triode 71 has a plate load resistor 73 coupled to a suitable B+ source of power supply voltage, the cathode thereof being connected to ground through a biasing resistor 74. Similarly, the triode 72 is coupled to the aforementioned B+ source of power supply through a load resistor 76, the cathode of triode 72 being connected to ground through a cathode biasing resistor 77.

Capacitor 78 and a resistor 79 between the grid of tube 71 and ground are coupled to the input lead 36' for supplying an alternating voltage version of the modulated voltage at lead 36' to tube 71. Similarly, capacitor 81 and a resistor 82 are coupled to lead 36' and the grid of tube 72 so that tubes 71 and 72 are fed in parallel with the velocity feedback voltage at lead 36'.

The output voltage signal from triode 71 is supplied through a capacitor 83 to a common feedback lead 23' for triodes 71 and 72. The output voltage signal from triode 72 is supplied to output lead 23' through capacitor 84 and an attenuating resistor 86. Thus, the velocity feedback voltage at lead 23' represents the combined output of triodes 71 and 72.

The gain of the triode tube 71 is made variable by connecting its control grid through a diode rectifier 87 having its anode side connected through a resistor 88 to the junction between the resistor 79 and capacitor 78. The cathode side of rectifier 87 is connected to the rotatable transformer error voltage lead 37'. The grid of tube 71 is also connected to ground through a "Thyrite" resistor 89 in series with a further resistor 91. A capacitor 92 is connected between the anode side of rectifier 87 and ground for storage and smoothing of pulsating voltages supplied from rectifier 87.

In operation of the circuit of Fig. 5, as a servo error voltage develops and becomes larger at lead 37', the grid of tube 71 is negatively biased by an increasing amount until, tube 71 is cut off and the only path for the velocity feedback voltage from lead 36' is through the triode 72. Thus, the amplifier shown in Fig. 5 has a minimum of gain and the servo system in which it may be employed as shown in Fig. 1 will be operated in its most responsive mode. After the servo error voltage reduces to zero, the grid biasing voltage stored by capacitor 92 begins discharging through resistors 88, 79 and the resistance path including the "Thyrite" resistor 89. Since the "Thyrite" resistor has non-linear impedance characteristics as has been described, the grid biasing voltage on tube 71 will be restored to a predetermined value above cut off for the tube in substantially the same time after a servo error signal voltage null even if previous to said null a large voltage was stored by capacitor 92. Thus, if the circuit shown in Fig. 5 is employed in a servo system as shown in Fig. 1, the servo output shaft 12 will be restored to a steady state condition in a minimum amount of time and the servo system will be driven into a sluggish mode of operation soon after settling of the input shaft 11 regardless of the magnitude of a change in the angular position of the input shaft 11.

Although a servo system employing a subsidiary feedback loop for velocity feedback stabilization has been described, it is obvious that other types of feedback such as a voltage proportional to acceleration and deceleration of a motor shaft could be used instead. Furthermore, since changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A servo system, comprising input means for receiving data information and output means for providing follow-up information, error means for comparing said data and follow-up information for providing an alternating error signal voltage which is a function of difference between said information, a control path having an input connected to said error means and an output connected to said output means for driving said output means in response to said error signal voltage for following said data information, a negative feedback loop coupled between first and second points in said control path for providing a negative feedback voltage to said path for servo system stabilization, said feedback means including a variable gain amplifier having an input and an output coupled between said first and second points, respectively, said amplifier having a further input coupled to said error means for gradually changing the gain of said amplifier from a predetermined maximum amount in response to a minimum error signal voltage to a predetermined minimum amount in response to an error signal voltage above a predetermined magnitude.

2. A servo system as set forth in claim 1, wherein said variable gain amplifier includes a variable time constant resistance-capacitance storage circuit coupled to said further input of said amplifier, said storage circuit including a capacitor having one terminal connected to ground and a resistor of non-linear resistance material which effectively decreases with an increase in voltage applied thereto connected between the other terminal of said capacitor and ground, and rectifier means connected between said error means and said other terminal of said capacitor for supplying a rectified version of said alternating error signal voltage thereto for storage by said capacitor as a gain regulating voltage at said further input of said amplifier, said resistor comprising part of a discharge path for said capacitor.

3. A servo system as set forth in claim 2, wherein said amplifier includes a pair of grid-controlled vacuum tubes connected for providing parallel paths for a feedback voltage derived from said second point in said control path, one of said vacuum tubes having substantially constant gain with the other of said vacuum tubes having a a gain regulating grid thereof connected to said storage circuit for receiving said gain regulating voltage, and means for combining signal outputs of said pair of vacuum tubes for feedback of a resultant degenerative voltage to said first point in said control path.

4. A variable gain amplifier, comprising an amplifier tube having a cathode, a grid and an anode, a capacitor between said grid and ground, means coupled across said capacitor for supplying a direct current charging voltage thereto for biasing the grid of said tube and controlling the gain thereof as a function of the magnitude of said charging voltage, and a resistive discharge path to ground for said capacitor for discharging the voltage stored thereacross whenever said charging voltage is reduced, said discharge path including a resistor having non-linear resistance characteristics for discharging said capacitor to a predetermined value of voltage in a predetermined period of time after cessation of a charging voltage of magnitude above said value, said period of time being substantially independent of the magnitude of said charging voltage.

5. A variable gain amplifier as set forth in claim 4, wherein said resistor is comprised of a non-linear resistance material in which current varies as a power of the applied voltage so as to effectively decrease in resistance for an increased charging voltage.

6. A servo system of the type employing a subsidiary negative feedback loop, said loop including a variable gain discharge tube amplifier device having a cathode, anode, grid and input means for receiving an alternating voltage for amplification, means for applying a direct voltage of variable magnitude between said grid and cathode of said discharge device for regulating the gain of said discharge device, said last-named means including a rectifier of alternating voltages, a resistor-capacitor filter circuit between said rectifier and said grid of said discharge device, said filter circuit including a capacitor connected between said rectifier and ground and a resistance discharge path across said capacitor to ground, said discharge path including a resistor having a non-linear resistance characteristic which is an inverse function of the voltage supplied across said capacitor by said rectifier, whereby the discharge time for said capacitor to a predetermined voltage level is approximately the same over a range of different voltage magnitudes to which said capacitor may be previously charged.

7. A servo system as set forth in claim 6, wherein said feedback loop includes a further discharge tube amplifier device of substantially constant gain having an input circuit connected in parallel with the input means of said variable gain amplifier device and an output circuit for combining amplified voltage outputs provided by said discharge tube amplifiers.

8. A variable gain amplifier, comprising a first amplifier tube having a cathode, a grid and an anode, a capacitor connected between said grid and ground, means coupled across said capacitor for supplying a direct current charging voltage thereto for biasing the grid of said tube and controlling the gain thereof as a function of the magnitude of said charging voltage, a resistive discharge path to ground for said capacitor for discharging the voltage stored thereacross whenever said charging voltage is reduced, said discharge path including a resistor having non-linear resistance characteristics for discharging said capacitor to a predetermined value of voltage in a predetermined period of time after cessation of a charging voltage of magnitude above said value, said period of time being substantially independent of the magnitude of said charging voltage, input means coupled to said first amplifier tube for supplying an alternating voltage signal thereto for amplification, and a further amplifier tube having an input in parallel with said first amplifier tube for amplifying said alternating voltage signal, each of said tubes having an output circuit coupled together for mixing amplified output voltages from said amplifier tubes.

9. The combination as set forth in claim 8, wherein said first amplifier tube is a pentode having a control grid for receiving said alternating voltage signal, said pentode having a suppressor grid constituting the grid to which said capacitor is connected, said capacitor being responsive to said direct current charging voltage for storing a voltage for biasing the suppressor grid of said pentode negatively relative to the cathode of said pentode.

10. The combination as set forth in claim 9, wherein said further amplifier tube is a triode having a substantially constant gain which is independent of the gain of said pentode.

References Cited in the file of this patent
UNITED STATES PATENTS

| | | |
|---|---|---|
| 2,097,882 | Hudtwalker | Nov. 2, 1937 |
| 2,281,644 | Weathers | May 5, 1942 |
| 2,343,207 | Schrader et al. | Feb. 29, 1944 |
| 2,452,609 | Somers et al. | Nov. 2, 1948 |
| 2,454,191 | McDonald | Nov. 16, 1948 |
| 2,479,335 | Fox | Aug. 16, 1949 |
| 2,480,678 | Skudre | Aug. 30, 1949 |
| 2,517,556 | Goertz | Aug. 8, 1950 |
| 2,616,971 | Kannenberg | Nov. 4, 1952 |
| 2,698,419 | Blair | Dec. 28, 1954 |